United States Patent
Klein et al.

(10) Patent No.: US 8,538,993 B2
(45) Date of Patent: Sep. 17, 2013

(54) OUTSOURCED OPTIONS MANAGEMENT

(75) Inventors: Marc-Oliver Klein, Mannheim (DE); Dennis Landscheidt, Mannheim (DE)

(73) Assignee: SAP AG, Walldorf (DE)

( * ) Notice: Subject to any disclaimer, the term of this patent is extended or adjusted under 35 U.S.C. 154(b) by 306 days.

(21) Appl. No.: 12/982,057

(22) Filed: Dec. 30, 2010

(65) Prior Publication Data
US 2012/0051535 A1 Mar. 1, 2012

Related U.S. Application Data

(60) Provisional application No. 61/376,873, filed on Aug. 25, 2010.

(51) Int. Cl.
*G06F 17/30* (2006.01)

(52) U.S. Cl.
USPC ............ 707/791; 707/802; 707/822; 707/828

(58) Field of Classification Search
USPC .................................................. 707/600–899
See application file for complete search history.

(56) References Cited

U.S. PATENT DOCUMENTS

| | | | |
|---|---|---|---|
| 2002/0128851 A1* | 9/2002 | Chefalas et al. ................. | 705/1 |
| 2007/0256083 A1 | 11/2007 | Vayssiere | |
| 2008/0154950 A1 | 6/2008 | Gross | |
| 2009/0144694 A1 | 6/2009 | Lin et al. | |
| 2009/0287617 A1 | 11/2009 | Schmidt | |

OTHER PUBLICATIONS

'MSISDN' [online]. Wikipedia, 2007 [retrieved on Mar. 10, 2011]. Retrieved from the Internet, <URL: http://web.archive.org/web/20071029015418/http://en.wikipedia.org/wiki/MSISDN>.
'Basic Settings for Change Processes' [online] SAP Library, [retrieved on Oct. 31, 2010]. Retrieved from the Internet.
'Change Processes' [online] SAP Library, [retrieved on Oct. 8, 2010]. Retrieved from the Internet:<URL:help.sap.com/saphelp_crm60/helpdata/en/31/cb6b3de666930fe10000000a114084/co..>, 3 pages.
'Overview of Change Processes' [online] SAP Library, [retrieved on Oct. 8, 2010]. Retrieved from the Internet: <URL:help.sap.com/saphelp_crm60/helpdata/en/05/3b883cb0bd2019e10000000a114084/co..>, 3 pages.
'Business Rule Framework: Rules for Change Processes in Leasing' [online]. SAP Library, [retrieved on Oct. 8, 2010]. Retrieved from the Internet: <URL:help.sap.com.saphelp_crm60/helpdata/en/43/15cbe286c7576ee10000000a1553f6/co..>, 2 pages.

* cited by examiner

*Primary Examiner* — Isaac M Woo
(74) *Attorney, Agent, or Firm* — Fish & Richardson P.C.

(57) ABSTRACT

A computer-implemented method for processing options requests includes: storing, in a first system, static information regarding subscriptions by customers, the static information including at least customer names and product identifiers; storing, in a second system separate from the first system, flexible information regarding the subscriptions including at least activated options; and processing requests from the customers regarding options in the second system, wherein the first system and the static information are not used in processing the requests.

15 Claims, 4 Drawing Sheets

OUTSOURCED OPTIONS MANAGEMENT

CROSS-REFERENCE TO RELATED APPLICATIONS

This application claims priority to U.S. Provisional Application Ser. No. 61/376,873, filed on Aug. 25, 2010, and entitled "Outsourced Options Management," the contents of which are hereby incorporated herein by reference.

BACKGROUND

In some markets or geographic regions, business is characterized by a relatively high volume of orders and contracts, such as in the telecommunications industry and partially also in the utilities sector. This can be the case with telecom services in emerging markets. For example, among the 120 million customers of a telecom company in Indonesia, 90% of the customers may use the company's prepaid-services option, resulting in a high volume with relatively low margin. In such an example, growth may be approximately 80 million customers a year, with 70 million customers churning yearly. A majority of these customers choose options on top of their contracts, such as Internet access, ringtones, a flat rate etc. Such a high volume of incoming orders can significantly tax the resources of the telecom company's customer relationship management (CRM) system.

Another situation involves a partially or fully privatized utilities sector, for example one in which multiple electric utilities are providing electricity to the public. These utility companies sometimes work with so-called smart grids, intelligent power networks that can react to power overloads or outages.

SUMMARY

In some implementations, a CRM application manages the essential information for each of a company's contracting customers (e.g., millions of service subscribers), but the management of data-intensive individual and dynamic customer options is outsourced to an application outside the CRM system.

In some implementations that use existing standard contracts for customers, these contracts are created in the CRM system. All option management may be outsourced to a lean application, as these options are highly dynamic and not relevant for the actual CRM contract.

In some implementations, billing instances are created and provided via a high volume option management tool. The system itself can manage the options per customer with all interdependencies.

Some implementations can manage requests from individual customers regarding smart grids in energy networks. For example, during peak hours of solar or wind power production the network can send offers to a customer, prompting the customer to turn on the heat or start the customer's washing machine. In these and other situations, the volumes of orders received from the customers can be such that it is helpful or necessary to manage the incoming orders in a high volume option management tool.

In one aspect, a computer-implemented method for processing options requests includes: storing, in a first system, static information regarding subscriptions by customers, the static information including at least customer names and product identifiers; storing, in a second system separate from the first system, flexible information regarding the subscriptions including at least activated options; and processing requests from the customers regarding options in the second system, wherein the first system and the static information are not used in processing the requests.

In a second aspect, a computer program product tangibly implemented in a computer readable storage device includes instructions that when executed perform a method comprising: storing, in a first system, static information regarding subscriptions by customers, the static information including at least customer names and product identifiers; storing, in a second system separate from the first system, flexible information regarding the subscriptions including at least activated options; and processing requests from the customers regarding options in the second system, wherein the first system and the static information are not used in processing the requests.

Implementations can include any or all of the following features. The method further includes: sorting the requests regarding options from all received requests; and processing a remainder of the received requests other than in the second system. Storing the flexible information includes: storing the flexible information in a database in the second system; and storing dependency relevant portions of the flexible information also in an in-memory database in the second system. Processing each of the requests includes first determining whether the request satisfies any dependency requirement specified in the flexible information. Upon a determination that the request satisfies the dependency requirement the method further comprises checking customer eligibility. The method further includes receiving an administrator input to update the flexible information regarding the subscriptions; and modifying the flexible information in the second system based on the input, wherein the first system and the static information are not used in modifying the flexible information.

In a third aspect, a system includes: a first system storing static information regarding subscriptions by customers, the static information including at least customer names and product identifiers; and a second system, separate from the first system, storing flexible information regarding the subscriptions including at least activated options, the second system processing requests from the customers regarding options, wherein the first system and the static information are not used in processing the requests. The first and second systems are implemented using a computer readable storage device.

Implementations can include any or all of the following features. A watchdog component separating the requests regarding options from all received requests, wherein a remainder of the received requests is processed other than in the second system. A database in the second system stores the flexible information, and an in-memory database in the second system stores dependency relevant portions of the flexible information. A rules component first determines whether the request satisfies any dependency requirement specified in the flexible information. Upon a determination that the request satisfies the dependency requirement the rules component further checks customer eligibility. An options management component that: receives an administrator input to update the flexible information regarding the subscriptions; and modifies the flexible information in the second system based on the input, wherein the first system and the static information are not used in modifying the flexible information.

Implementations can provide any or all of the following advantages. A high volume option management tool need not carry unnecessary overhead of CRM objects. For example, the tool may be storing the information in tables. Such a database can also be used with an in-memory approach for high availability and for faster database storage or retrieval. The management of a high volume of options information does not create unnecessary overhead for the company.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
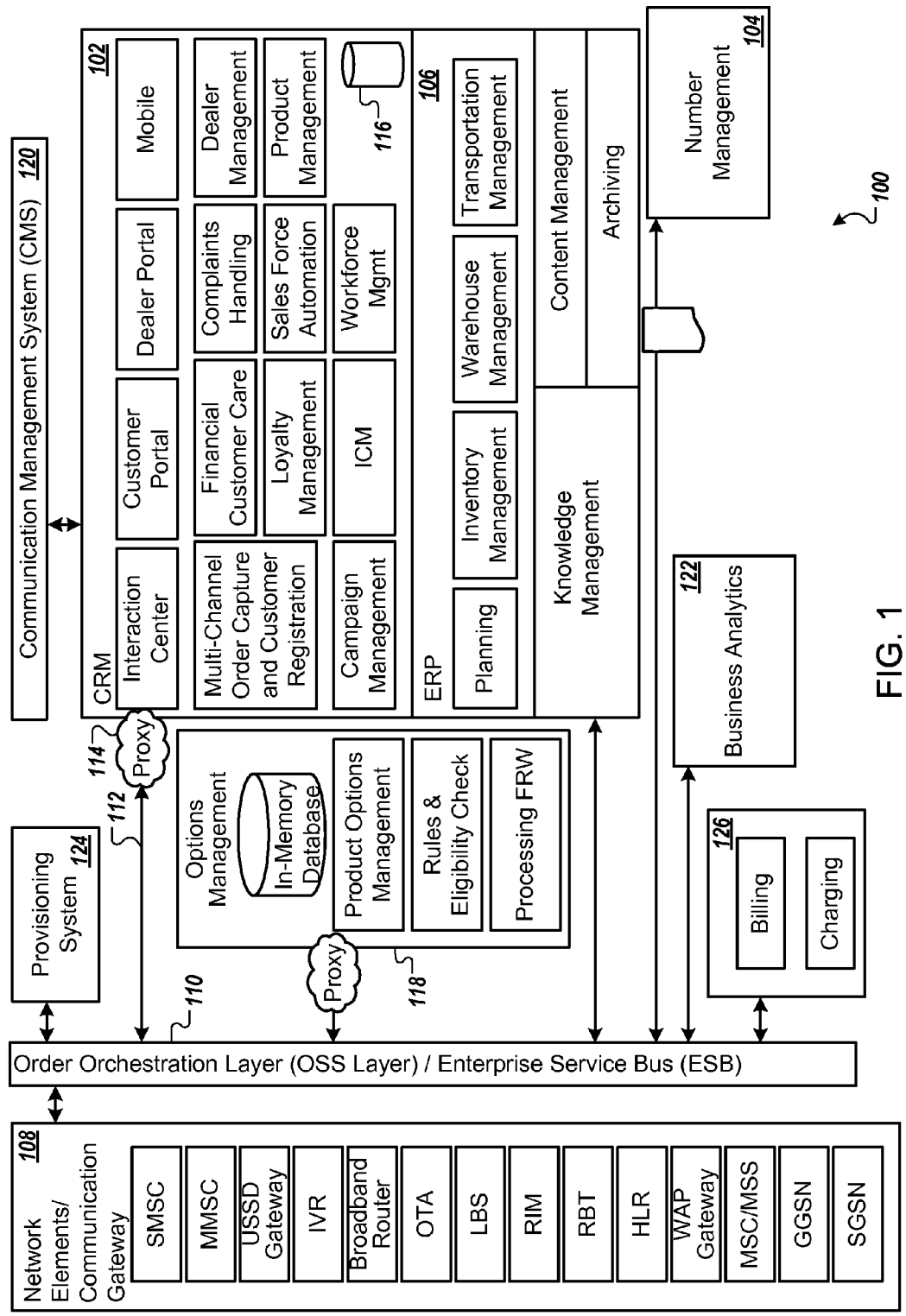
FIG. 1 shows a system that can be used for managing options.

FIG. 1 shows a system 100 that can be used for managing options. In some implementations, flexible subscription information is managed separately from static subscription information. For example high-volume options are processed without involving a CRM system where the underlying subscriptions are recorded. An outsourcing of options management can reduce the demands on the CRM system and allow for fast, flexible and seamless interaction with large number of customers.

The system 100 includes a CRM system 102 that is designed and configured to provide CRM services to an organization and maintain CRM records. In some implementations, a telecommunications company owns and operates the CRM system 102 as part of its business activities. For example, the company provides a communication network for mobile devices (e.g., smartphones, media players or other digital devices) and has a large number of customers (e.g., many millions of individuals) enlisted as subscribers according to one or more subscription plans. As another example, a utility provides electricity or other services to the public via a smart grid or other infrastructure. The CRM system 102 can serve as a single point of entry for customer service agents.

The system 100 includes a number management system 104 that manages numbers for assignment to various customers. In some implementations, the numbers relate to subscriptions for telecom services. For example, the number management system 104 manages SIM card numbers and MSISDNs.

In implementations that involve utilities or other similar services, the system 100 can instead of, or in addition to, the number management system 104 include one or more other components designed for supporting such service(s). For example, the system 100 can interface with a plant or other facility in a smart grid that produces energy at an electric utility. As another example, some or all of the system 100 can be used on behalf of an electric utility at a customer's house or in an offshore windpark.

The system 100 includes an enterprise resource planning (ERP) system 106 that performs planning, and also manages inventory, warehouses and transportation, to name just a few examples. In some implementations, the ERP system 106 performs procurement of SIM cards and hardware, such as mobile devices. For example, the ERP system 106 generates a batch input to the CRM system 102 for creating a list of all pre-activated SIM card numbers, MSISDNs, associated retailers and related products. For example, products can include, but are not limited to, subscription plans offered by a telecom company. As another example, the ERP system 106 is configured to receive data on production of electricity or other service, and can provide information to the CRM system 102 that is necessary for its CRM services.

To further illustrate operation of the system 100, the following example involves a prospective customer who is currently in the process of purchasing a new mobile device (e.g., a cellphone) from one of the retailers associated with the telecom company. In some implementations, the customer then sends a text message (e.g., an SMS message) to the telecom company to initiate a subscriber account. This initiation message from the customer is received by a network elements and communication gateway in the system 100, here referred to as a network system 108. The network system 108 corresponds to parts of an overall network that interact with option management and can include any number of network elements to facilitate interaction with customers or others. For example, APIs or other interfaces can be used, such as an SMS Gateway that is used to register SIM cards.

The network system 108 forwards the initiation message (or a part thereof) to a layer 110 that is configured to manage communication between entities in the system 100, and serves the purpose of integrating applications for the enterprise. In addition to that, the layer 110 performs order management, for example by orchestrating orders between different systems based on certain rules. For example, the layer 110 can be implemented as an enterprise services bus.

The layer 110 submits a registration request 112 to the CRM system 102 based on the initiation message received from the customer. This prompts the CRM system 102 to register the customer, and create and manage a corresponding object representing the customer. The subscription information stored by the CRM system, including at least a customer name and an identifier for the product, is an example of static subscription information that should not be involved when subscriber options are managed. In some implementations, the initiation message is not received directly from the customer but instead from another entity, for example a call center agent.

The system 100 includes a proxy function 114 between the layer 110 and the CRM system 102. For example, when a large number of initiation requests are received over a short period of time, the proxy function 114 can queue the requests that are waiting to be processed.

The CRM system 102 records what product(s) the customer has purchased. In some implementations, the CRM system 102 detects whether the customer's contract is for prepaid telecom services (a "prepaid plan"), or for postpaid services (a "postpaid plan"), or for a combination of the two types of services (a "hybrid plan"). The CRM system 102 maps the product(s) and the SIM card number to each other, for example with the telephone number that was used for activation. The CRM system 102 can store such information in a technical resources repository 116.

The system 100 includes an options management system 118 that manages options for each of the customer subscriptions or other accounts. When a SIM card is initially activated, the CRM system 102 updates the options management system 118 so that it can manage options for that account. Here, the CRM system 102 identifies the MSISDN and the activated product(s) to the options management system 118, for example by a web service interface. For example, the options management system 118 can be Java-based and implemented using the composite applications framework in the NetWeaver product available from SAP AG.

Also, the CRM system 102 updates the options management system 118 with all options of the current subscription plan that have been activated for the particular customer. For example, the customer chooses at the time of purchase whether to activate one or more of the available options, and can then modify the option selection(s) throughout the term of the subscription subject to the rules of the purchased plan. Such activated options are examples of flexible subscription information that in some implementations is processed frequently for each customer (because customers often select new options during the life of their subscriptions) and in high volume (because many customers are signed up for the same or similar subscription plans).

Subscription plans can provide for any type of options for the customer. In some implementations, options can involve purchase of services or goods, download of content, enrollment in a program, upgrade of a device, receipt of a rebate or other benefit, encashment of accumulated points or other markers, and/or unsubscription or other withdrawal of participation. For example, an option can request subscription to a particular ringtone (e.g., for a month) or access to the internet (e.g., for two hours).

The system 100 includes a communication management system 120 that is responsible for ensuring all inbound and outbound communication with the CRM system 102 (e.g., into an interaction center). In some implementations, the communication management system 120 provides computer telephony integration, as well as mail and SMS integration with routing functionality. For example, the communication management system 120 can be implemented using an SAP Business Communications Management system.

The system 100 includes a business analytics system 122 that performs reporting and analytics. For example, the business analytics system 122 monitors option changes and customer behavior and generates reports according to predefined templates.

The system 100 includes a provisioning system 124 that activates SIM cards and options in the network. During activation, the provisioning system 124 makes sure that the provisioning relates to the right SIM card number having the right MSISDN, and for the right product. The provisioning system 124 also manages de-activation of SIM cards and options.

The system 100 includes a billing and charging system 126 that is responsible for metering and charging all events in the network. In some implementations, the billing and charging system 126 administers costs based on options and/or other usage. For example, the billing and charging system 126 executes billing and creates invoices.

Figure 2:
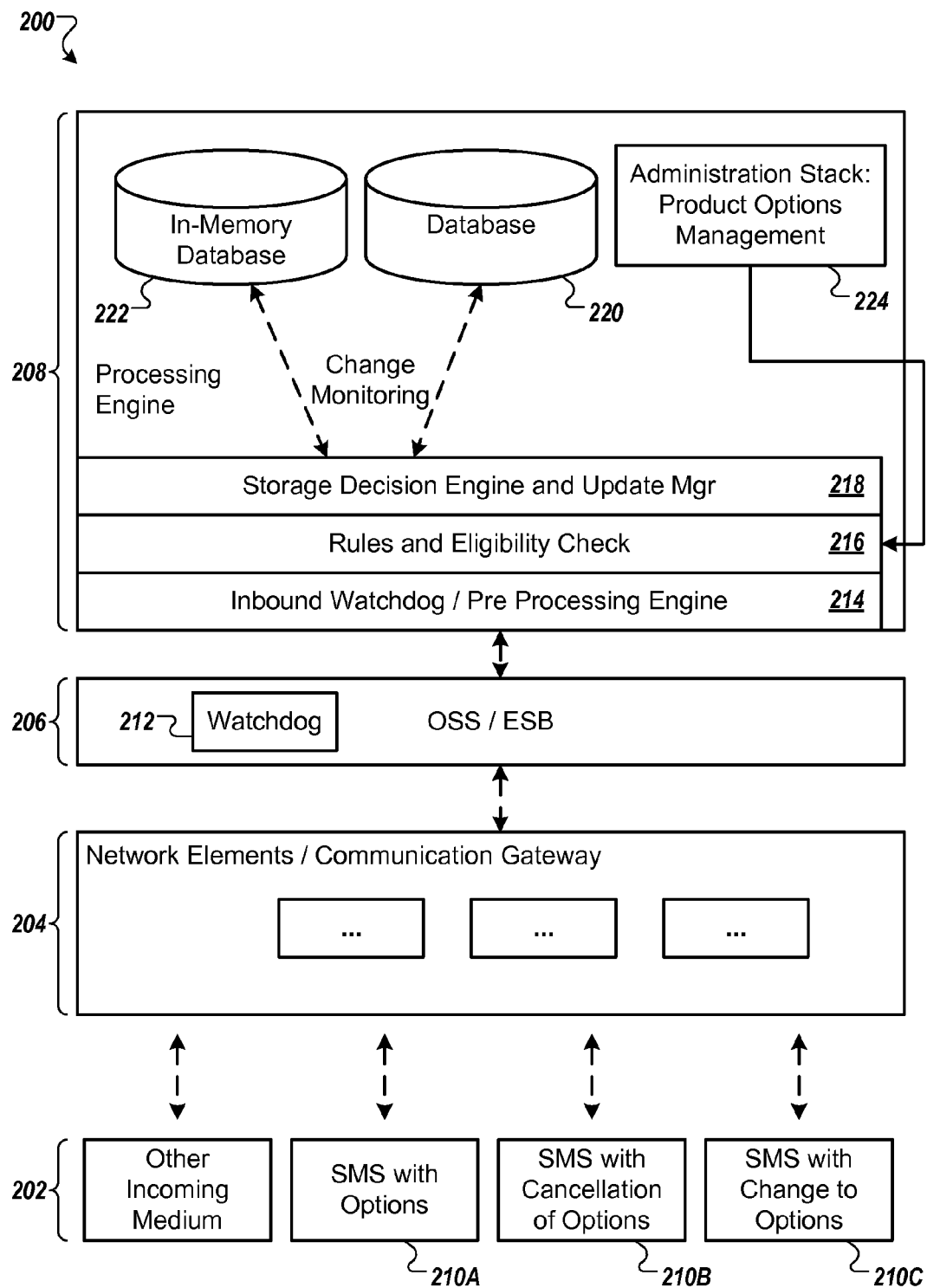
FIG. 2 shows an architecture that can be used for managing options.

FIG. 2 shows an architecture 200 that can be used for managing options. Here, the architecture 200 includes layers 202-208. The interface layer 202 provides interaction with customers and/or others. In some implementations, the customer can generate one or more SMS messages 210A-C. For example, the message 210A seeks to activate at least one option for the customer; the message 210B cancels an option, and the message 210C changes one or more options for the customer (e.g., to increase or decrease the number of minutes that the company allots to the customer's cellphone every month).

The layer 204 includes network elements and provides a communication gateway. For example, the layer 204 can be implemented as the network system 110 (FIG. 1).

The layer 206 manages communication and integrates applications in the system, as well as performs order management. In some implementations, the layer 206 sorts all received requests into requests regarding options, and other requests, so that the other requests can be processed other than in the options management layer 208. For example, the layer 206 can be substantially identical or similar to the layer 108 (FIG. 1).

In some implementations, the layer 206 includes a watchdog component 212 that watches for new orders, updates on subscriptions or options, and other requests. The watchdog component 212 can include a Java-based application. The watchdog component 212 can obtain or receive exceptions from options management, for example to notify the user about any denied request(s) or other ineligibility.

The options management layer 208 manages options for each of the subscribing customers. Here, the options management layer 208 includes a component 214 that serves as an inbound watchdog and a preprocessing engine. The inbound watchdog analyzes the changes that come in, for example via a web service interface. Based on the incoming object(s), the preprocessing engine triggers a rules and eligibility check 216 in the options management layer 208.

The rules and eligibility check 216 determines whether the received request should be granted. Assume that the message 210C is here received because the subscribing customer is requesting to change an option that is currently active. First, the check 216 determines whether the option being changed has any dependencies. Some options may depend on one or more other options. For example, to activate an option of activating an email account it is required that the customer has activated an option that grants internet access. If there is at least one dependency, the check 216 determines using the information in the options management layer 208 whether the dependency requirement is satisfied.

After determining that the dependency requirement is met, or directly after determining that the option has no dependencies, the check 216 accesses at least one other resource to ascertain whether the received request should be granted. Such checking can focus on the subscriber's account and/or the particular customer type that has been assigned to the subscriber. In some implementations, the check 216 contacts the billing and charging system 126 (FIG. 1). For example, with a postpaid plan the check 216 triggers the billing and charging system 126 to allocate a corresponding amount to be paid by the customer. As another example, with a prepaid or hybrid plan the check 216 can determine whether the customer has a sufficient balance for the change that is being requested.

If the request is denied the options management layer 208 can cause a message (e.g., a response SMS) to be sent to the customer. In contrast, if the check 216 determines that the request should be granted, the new or changed option is provisioned for the customer's benefit. For example, the system makes the sought ringtone(s) available for download or grants the requested amount of internet access.

The options management layer 208 will store information about the changed option. Here, a component 218 includes a storage decision engine and an update manager. Every new option, changed option and cancelled option is recorded in a database 220. That is, the database 220 will contain, for each of the many subscribers that are using the company's services, a complete record of the options that are currently active for the customer or that have ever been activated for the customer. The database 220 can be implemented using any suitable database technology.

On the other hand, an in-memory database 222 will only have the option(s) for each customer that is or are relevant for further eligibility checks. In some implementations, activation of internet access is a prerequisite for web based services, and accordingly information reflecting that the customer has requested and been granted internet access is stored both in the database 220 and also in the in-memory database 222. When the check 216 seeks to determine whether an options request should be granted, and this request has at least one dependency, the check 216 will verify in the in-memory database 222 that the prerequisite option has been activated for this particular customer.

In contrast, options that do not affect the availability of, or eligibility for, any other option are not registered in the in-memory database 222. For example, no option depends for its availability on whether the subscriber has previously downloaded a ringtone. Accordingly, a customer's actions of downloading ringtones are not recorded in the in-memory database 222 but are recorded in the database 220 (e.g., for billing and other CRM purposes). The in-memory database 222 is implemented in a memory of the system that performs options management, for example in the options management system 118 (FIG. 1). Whether both or only one of the databases is updated, the CRM system 102 (FIG. 1) is not affected by the update. For example, the contract between this particular customer and the organization, which is stored in the CRM system, is not updated or otherwise accessed. Accordingly, a very high volume of options can be processed and managed without using any aspect of the CRM system's resources.

The options management layer 208 here includes an administration stack 224 for product options management. In some implementations, the administration stack 224 provides a modeling environment for product options. For example, an administrator user can model the options and dependencies between options, at any time while the plan is in effect.

In some implementations, the administration stack 224 provides attributes management. For example, the administrator user can maintain attributes for options to display, for example based on whether it is a short-term or long term option.

In some implementations, the administration stack 224 provides product mapping. For example, the administrator user can map to the product models used in the particular landscape (e.g., from CRM and/or billing system). As another example, an upload can be made if a certain paradigm is used.

In implementations that involve utilities or other similar services, the architecture 200 can operate in a manner essentially equivalent to that described above. For example: the layer 202 provides one or more interfaces for utility customers (e.g., an online site or a customer service phone bank), and the layer 208 manages the options that the utility customers select or change for their respective services, such as based on the current level of electricity production and consumption in the utilities smart grid.

Figure 3:
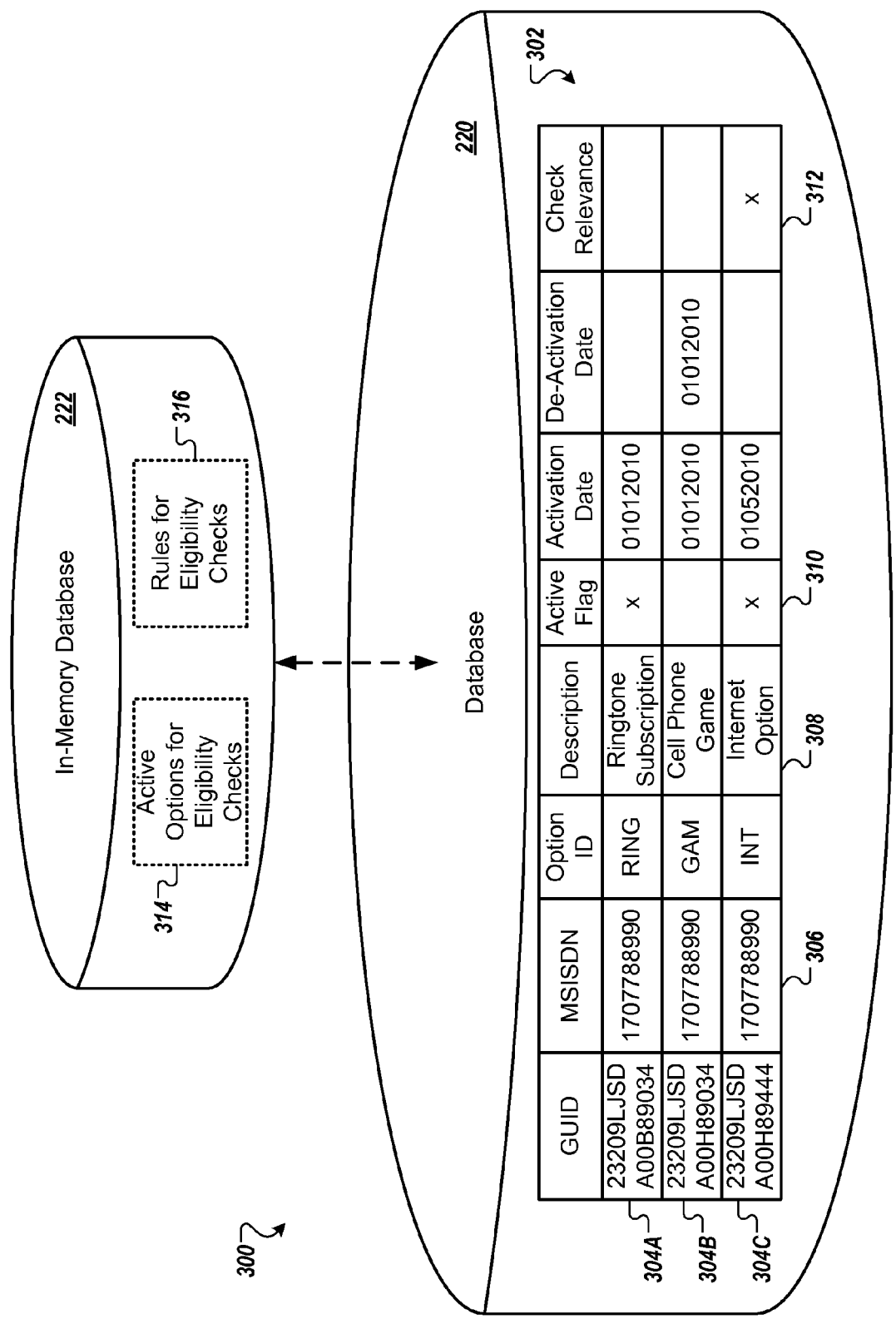
FIG. 3 shows a database system that can be used for managing options.

FIG. 3 shows a database system 300 that can be used for managing options. Here, the database system includes the database 220 and the in-memory database 222. The database 220 includes at least one table 302, which here contains three entries 304A-C corresponding to respective options. For each option, a column 306 lists the associated MSISDN (e.g., a key field); a column 308 describes the option; a column 310 indicates whether the option is currently active; and a column 312 indicates whether the option is relevant for further checking. For example, the options 304A and B, which do not have entries in the column 312, would be stored in the database 220 but not in the in-memory database 222. In contrast, the option 304C that is marked as relevant for checking will also be stored in the in-memory database 222.

In implementations that involve utilities or other similar services, the table 302 can operate in a manner essentially equivalent to that described above. For example: the option 304A can relate to a biweekly billing cycle (as opposed to monthly), and the option 304C can relate to direct debit payment from the customer's bank account (as opposed to invoice billing). In such a situation, the option 304C may be relevant for checking and would therefore have an entry in the column 312. In some implementations, the same applies to different tariffs that can be selected on demand based on energy consumption and production. Based on the customers contract terms he or she will receive offers that will be checked and booked in the database.

The in-memory database 222 includes information 314 that reflects the options currently active that are relevant for checks. That is, the information 314 is an example of dependency relevant portions from flexible subscription information. The information 314 here includes the option 304C.

The in-memory database 222 includes information 316 that corresponds to rules for eligibility checks. For example, the information 316 reflects that the option for initiating an email account is dependent on the option for initiating internet access. The rules in the information 316 can be updated as necessary.

Figure 4:
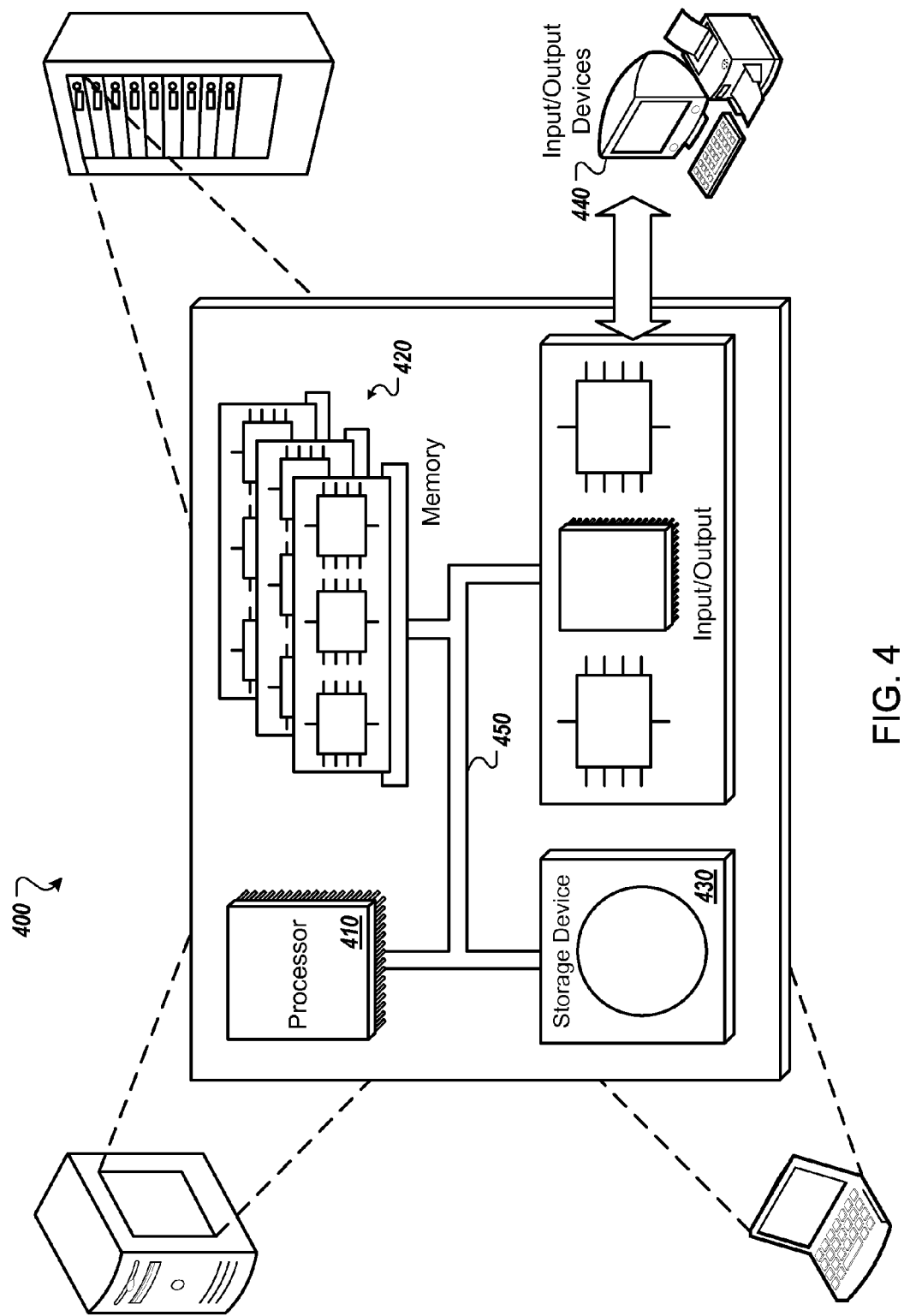
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. The memory 420 is a volatile memory unit in some implementations and is a non-volatile memory unit in other implementations.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for processing options requests, the method comprising:
storing, in a first system, static information regarding subscriptions by customers, the static information including at least customer names and product identifiers;
storing, in a second system separate from the first system, flexible information regarding the subscriptions including at least activated options;
processing requests from the customers regarding options in the second system, wherein the first system and the static information are not used in processing the requests;
receiving an administrator input to update the flexible information regarding the subscriptions; and
modifying the flexible information in the second system based on the input, wherein the first system and the static information are not used in modifying the flexible information.

2. The computer-implemented method of claim 1, further comprising:
sorting the requests regarding options from all received requests; and
processing a remainder of the received requests other than in the second system.

3. The computer-implemented method of claim 1, wherein storing the flexible information comprises:
storing the flexible information in a database in the second system; and
storing dependency relevant portions of the flexible information also in an in-memory database in the second system.

4. The computer-implemented method of claim 1, wherein processing each of the requests comprises first determining whether the request satisfies any dependency requirement specified in the flexible information.

5. The computer-implemented method of claim 4, wherein upon a determination that the request satisfies the dependency requirement the method further comprises checking customer eligibility.

6. A computer program product tangibly implemented in a computer readable storage device, the computer program product including instructions that when executed perform a method comprising:
storing, in a first system, static information regarding subscriptions by customers, the static information including at least customer names and product identifiers;
storing, in a second system separate from the first system, flexible information regarding the subscriptions including at least activated options; and
processing requests from the customers regarding options in the second system, wherein the first system and the static information are not used in processing the requests;
receiving an administrator input to update the flexible information regarding the subscriptions; and
modifying the flexible information in the second system based on the input, wherein the first system and the static information are not used in modifying the flexible information.

7. The computer program product of claim 6, the method further comprising:
separating the requests regarding options from all received requests; and
processing a remainder of the received requests other than in the second system.

8. The computer program product of claim 6, wherein storing the flexible information comprises:
storing the flexible information in a database in the second system; and storing dependency relevant portions of the flexible information also in an in-memory database in the second system.

9. The computer program product of claim 6, wherein processing each of the requests comprises first determining whether the request satisfies any dependency requirement specified in the flexible information.

10. The computer program product of claim 9, wherein upon a determination that the request satisfies the dependency requirement the method further comprises checking customer eligibility.

11. A system comprising:
a first system storing static information regarding subscriptions by customers, the static information including at least customer names and product identifiers;
a second system, separate from the first system, storing flexible information regarding the subscriptions including at least activated options, the second system processing requests from the customers regarding options, wherein the first system and the static information are not used in processing the requests; and
an options management component that:
receives an administrator input to update the flexible information regarding the subscriptions, and
modifies the flexible information in the second system based on the input, wherein the first system and the static information are not used in modifying the flexible information;
the first and second systems implemented using a computer readable storage device.

12. The system of claim 11, further comprising:
a watchdog component separating the requests regarding options from all received requests, wherein a remainder of the received requests is processed other than in the second system.

13. The system of claim 11, further comprising:
a database in the second system storing the flexible information; and
an in-memory database in the second system storing dependency relevant portions of the flexible information.

14. The system of claim 11, further comprising a rules component that first determines whether the request satisfies any dependency requirement specified in the flexible information.

15. The system of claim 14, wherein upon a determination that the request satisfies the dependency requirement the rules component further checks customer eligibility.

* * * * *